US006043829A

United States Patent [19]

Inoue

[11] Patent Number: 6,043,829

[45] Date of Patent: Mar. 28, 2000

[54] FRAME BUFFER MEMORY WITH LOOK-UP TABLE

[75] Inventor: Kazunari Inoue, Hyogo, Japan

[73] Assignee: Mitsubishi Denki Kabushiki Kaisha, Tokyo, Japan

[21] Appl. No.: 08/959,260

[22] Filed: Oct. 28, 1997

[30] Foreign Application Priority Data

Apr. 24, 1997 [JP] Japan .................................... 9-107418

[51] Int. Cl.[7] ...................................................... G06F 15/76

[52] U.S. Cl. .......................... 345/519; 345/509; 345/435; 345/508

[58] Field of Search .................................... 345/507–509, 345/511, 519, 435, 199, 510

[56] References Cited

U.S. PATENT DOCUMENTS

| | | | |
|---|---|---|---|
| 4,985,848 | 1/1991 | Pfeiffer et al. | 395/505 |
| 5,289,575 | 2/1994 | Godfrey | 395/517 |
| 5,386,505 | 1/1995 | Beattie et al. | 395/343 |
| 5,473,566 | 12/1995 | Rao | 365/189.12 |
| 5,544,306 | 8/1996 | Deering et al. | 345/507 |
| 5,694,143 | 12/1997 | Fielder et al. | 345/509 |
| 5,712,664 | 1/1998 | Reddy | 345/519 |
| 5,867,180 | 2/1999 | Katayama et al. | 345/519 |

FOREIGN PATENT DOCUMENTS

| | | | |
|---|---|---|---|
| 5-028089 | 2/1993 | Japan | G06F 13/16 |
| 5-341753 | 12/1993 | Japan | G09G 5/06 |

*Primary Examiner*—Kee M. Tung
*Attorney, Agent, or Firm*—McDermott, Will & Emery

[57] ABSTRACT

A frame buffer memory includes, on a semiconductor substrate: a DRAM array in which image information including frame information and window information are stored; two serial access memories for serially outputting the image information read from DRAM array by interleave method; a look-up table for outputting a selection signal in accordance with window information input; and a multiplexer for selectively outputting frame information input in accordance with said selection signal.

6 Claims, 5 Drawing Sheets

FRAME BUFFER MEMORY WITH LOOK-UP TABLE

BACKGROUND OF THE INVENTION

1. Field of the Invention

The present invention relates to a semiconductor device, and more particularly, to a frame buffer memory (simply referred to as "frame buffer" in the following) used in image processing.

2. Description of the Background Art

FIG. 6 is a block diagram showing a structure of a conventional general graphics system. As shown in FIG. 6, the graphics system includes: a system bus 100; a CPU (Central Processing Unit) 10 connected to system bus 100; a main memory 11 connected to system bus 100; a rendering controller 101 formed on a controller chip, and connected to system bus 100 and transferring the data stored in main memory 11; a frame buffer 102 connected to rendering controller 101 and storing the image data transferred; an RAM (Random Access Memory) digital-analog converter (RDAC) 103 connected to frame buffer 102 and responsive to a control signal received from rendering controller 101 for selectively outputting the image data provided from frame buffer 102; and a screen 104 connected to RDAC 103 and displays an image in accordance with the image data received.

Frame buffer 102 includes, for example, chips 102-1 to 102-4.

However, due to recent demand in enhanced performance for a graphics application and decrease in the price of memory, number of bits indicating information (information bit number) per pixel is increasing from 8 bits for indicating 256 colors to 16 bits for "index color", and further to 24 bits for "true color".

Furthermore, a recent graphics application has a double-buffer structure for enabling CRT (Cathode-Ray Tube) refresh operation for transmitting data from a frame buffer to an RDAC and write operation (rendering) for writing data to a frame buffer simultaneously, and switches between overlay image plane and RGB (Red-Green-Blue. Accordingly, information bit number per pixel is even increasing.

Therefore, the problem associated with a conventional graphics system shown in FIG. 6 is that the required number of output terminals increases as information bit number per pixel increases in its frame buffer 102, thereby resulting in the difficulty in manufacturing a package, board wiring or the like, as well as in the increase in manufacturing cost.

SUMMARY OF THE INVENTION

It is an object of the present invention to provide a frame buffer which requires a smaller number of output terminals even when information bit number per pixel is large.

In accordance with one aspect of the invention, a frame buffer includes: a semiconductor substrate; a first storage circuit formed on the semiconductor substrate for storing image information; a serial access memory formed on the semiconductor substrate for serially outputting the image information stored in the first storage circuit; and a selection circuit formed on the semiconductor substrate and connected to the serial access memory for selectively outputting the image information.

In accordance with another aspect of the invention, the selection circuit in the frame buffer includes: a second storage circuit connected to a serial access memory for prestoring prescribed data such that the prescribed data is output corresponding to each data input; and a selection output circuit for selectively outputting image information in accordance with the prescribed data output from the second storage circuit.

In accordance with still another aspect of the invention, in the frame buffer memory, the image information includes frame information and window information, the second storage circuit receives the window information, and the selection output circuit receives the frame information.

In accordance with yet still another aspect of the invention, the second storage circuit is a look-up table in the frame buffer memory.

Accordingly, a primary advantage of the present invention is that it can reduce the number of output terminals for a frame buffer memory, thereby reducing power consumption.

In addition, another advantage of the present invention is that it allows appropriate image information to be selecting output if the image information extends over multiple windows.

Still another advantage of the present invention is that the selection of image information can be readily achieved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
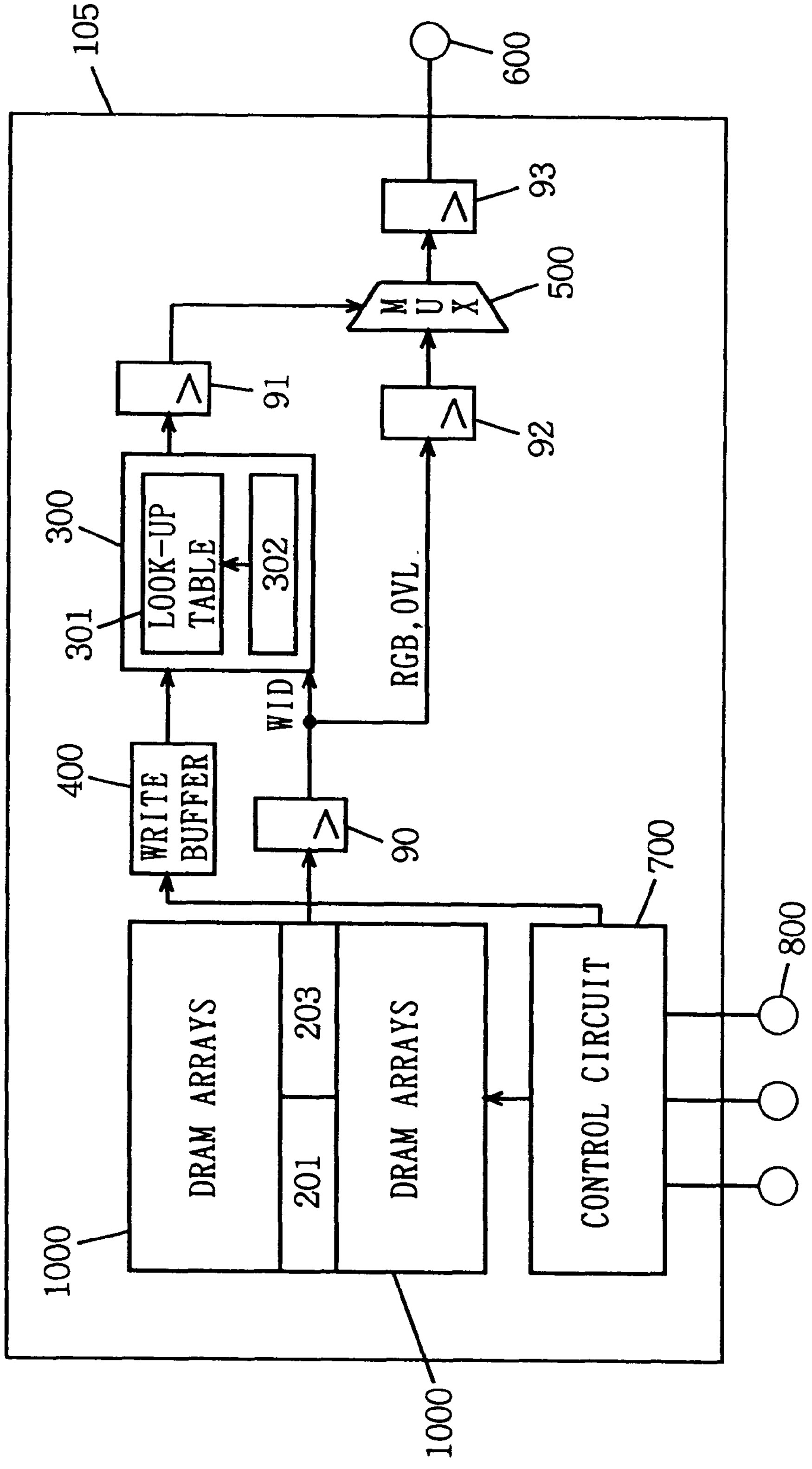
FIG. 1 is a diagram showing a general structure of a frame buffer in accordance with an embodiment of the present invention.

The embodiment of the present invention will now be described in detail with reference to the drawings. It is noted that the same numerals in the drawings represent the same or corresponding portions.

Figure 5:
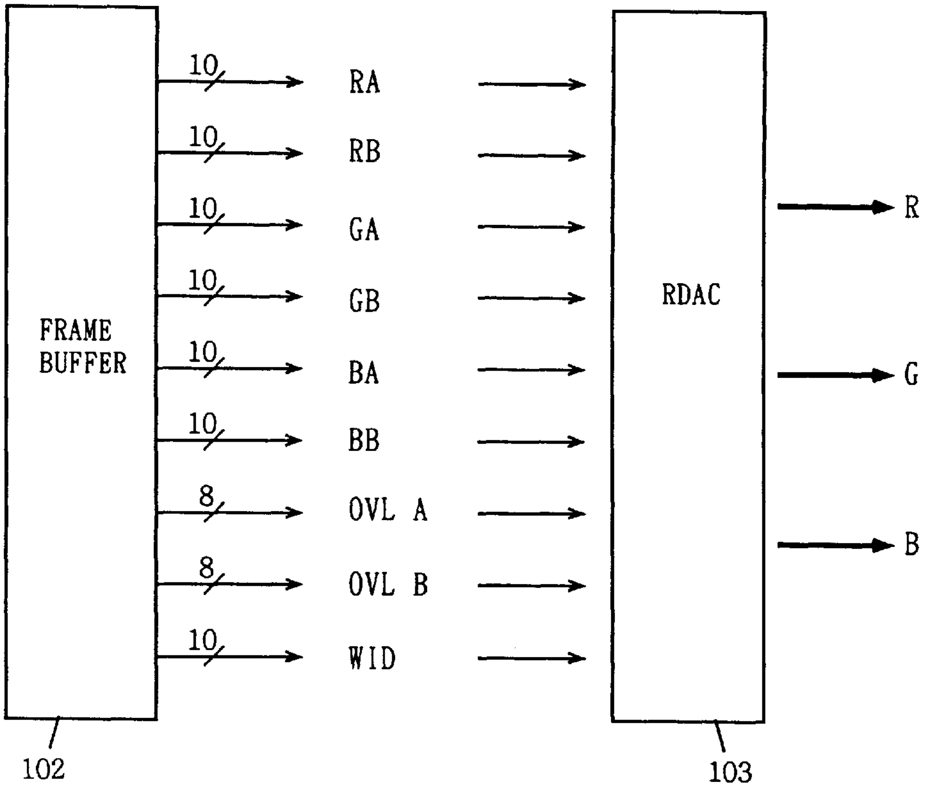
FIG. 5 is a diagram showing a problem to be solved by the present invention.
Figure 6:
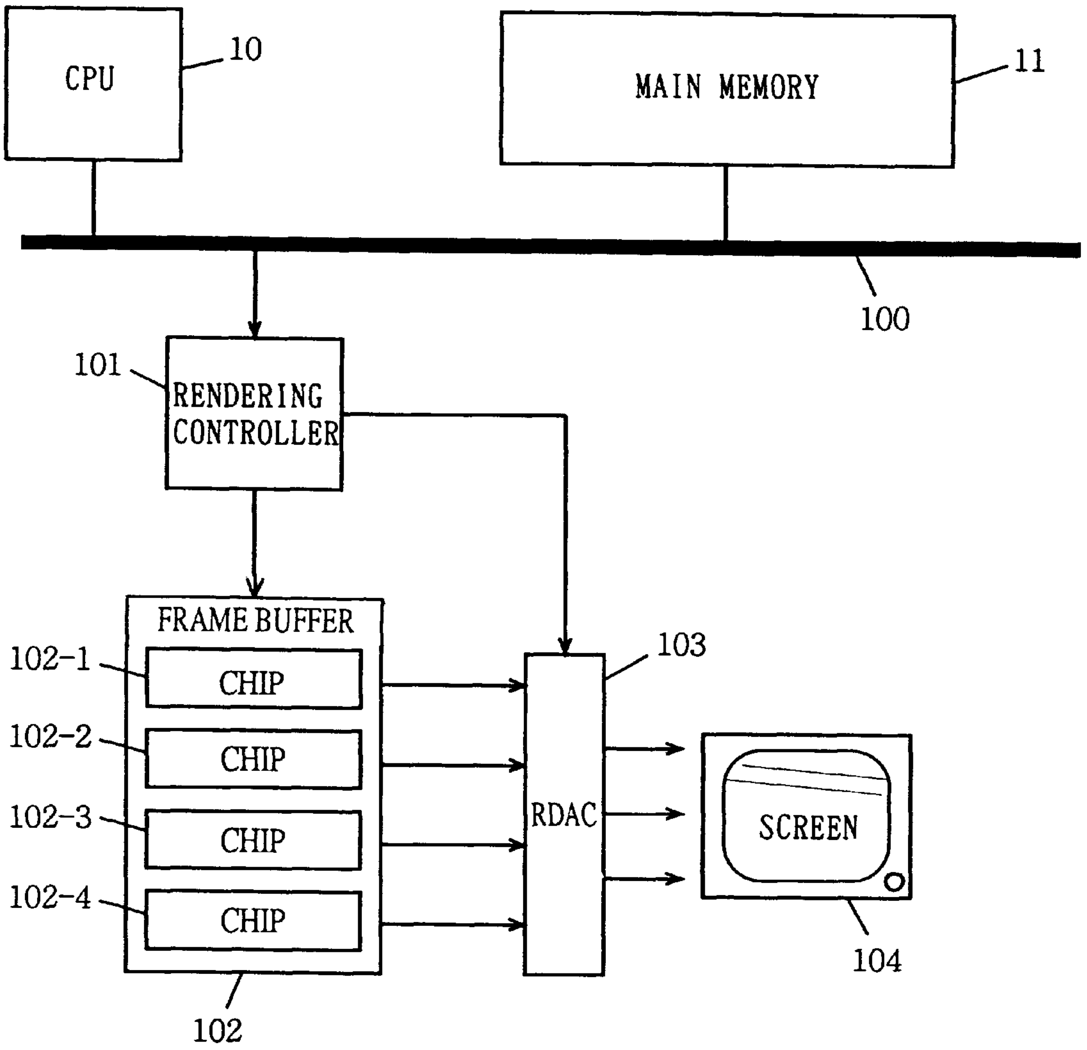
FIG. 6 PRIOR ART
FIG. 6 is a block diagram showing a conventional graphics system.

FIG. 5 is a diagram showing an example of frame buffer 102 in a conventional graphics system shown in FIG. 6 when information bit number per pixel is increased. In this example, frame buffer 102 includes double buffers for each of signals R, G and B, double buffers for overlay (OVL) signals, and a buffer for a window (area on screen) identification signal WID. 10-bit signals RA, RB, GA, GB, BA, BB, 8-bit signals OVLA, OVLB, or a 10-bit window identification signal WID are output from each of these buffers, and frame buffer 102 as a whole outputs information consisting of 86 bits to an RDAC 103 for every pixel.

In addition, information of 86 bits must be transferred to RDAC 103 approximately every 6.4 nsec for a screen having 1280×1024 pixels, and if the frame buffer consists of four chips 102-1 to 102-4, the data output rate is 86 bits/25.6 nsec. Here, assuming that if each of the output terminals of frame buffer 102 has a load of 20 pF and outputs a signal which swings between 0V and 3.3V every cycle, electricity as much as (86×20 pF×3.3V×3.3V/2×25.6 nsec=) 0.8 W will be consumed.

Accordingly, the present invention aims at reducing the number of output terminals for frame buffer 102.

FIG. 1 is a diagram showing a general structure of a frame buffer in accordance with an embodiment of the present invention. As shown in FIG. 1, the frame buffer includes: a plurality of external terminals 800 formed on a semiconductor substrate 105 and to which a control signal, an image signal or the like is supplied; a control circuit 700 connected to external terminals 800; and dynamic random access memory (DRAM) arrays 1000 for storing the image signal supplied to external terminal 800.

Here, the image signal includes frame information such as an RGB signal and an OVL signal, and a window identification signal WID (window information) for indicating to which window on a screen data belongs.

Furthermore, the frame buffer shown in FIG. 1 includes: serial access memories (video memories) A201 and B203 connected to DRAM array 1000 and serially outputting the data read from DRAM array 1000; a register 90 connected to serial access memories A201 and B 203; a write buffer 400 connected to control circuit 700; a lookup table 300 connected to register 90 and write buffer 400; a register 91 connected to look-up table 300; a register 92 connected to register 90; a multiplexer 500 connected to registers 91 and 92; a register 93 connected to multiplexer 500; and a plurality of output terminals 600 (only one of which is shown in FIG. 1) connected to register 93.

Figure 2:
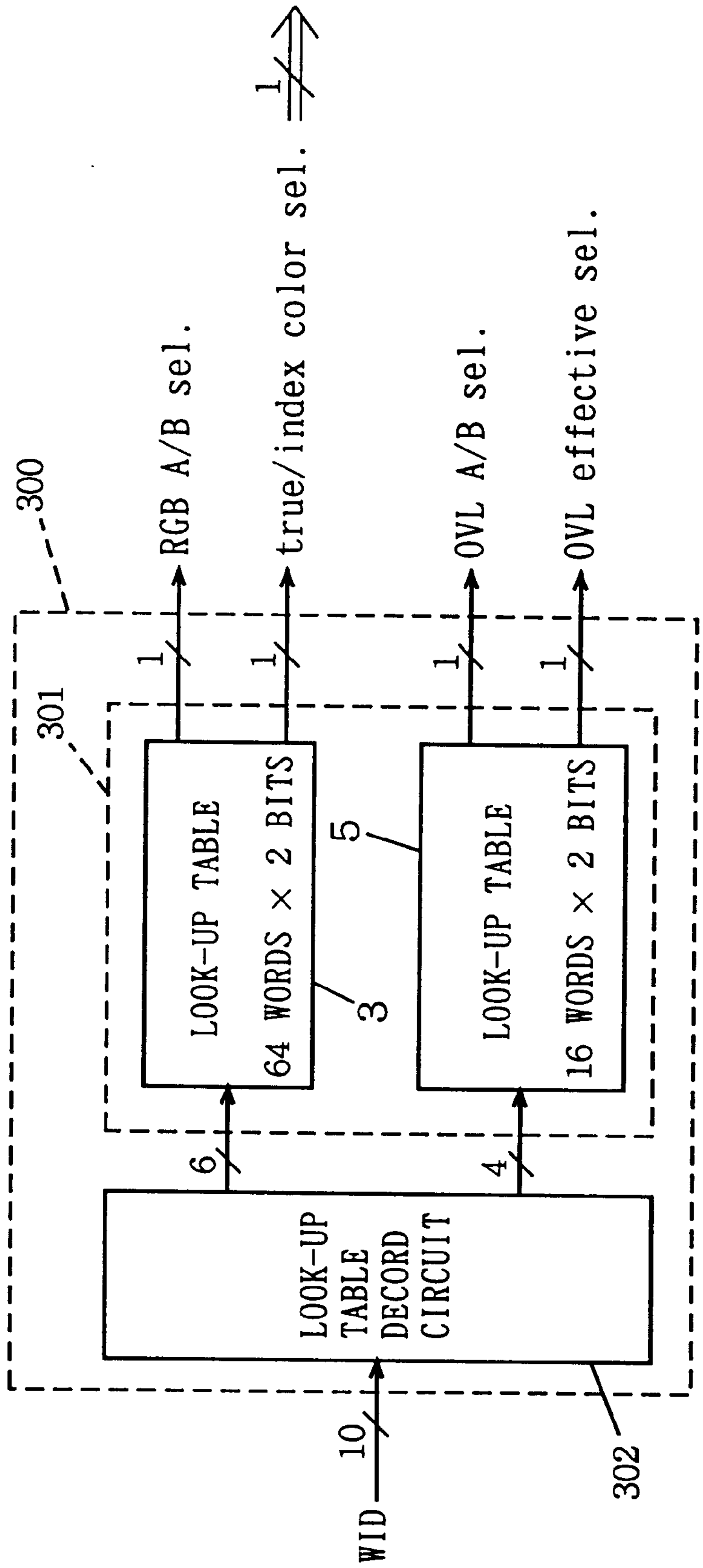
FIG. 2 is a diagram showing a structure of a look-up table shown in FIG. 1.

FIG. 2 is a block diagram showing a structure of look-up table 300 shown in FIG. 1. As shown in FIG. 2, look-up table 300 is a two-port memory connected between write buffer 400 and register 91, and includes a look-up table decode circuit 302 and a look-up table 301 connected to look-up table decoder circuit 302.

Look-up table 301 includes a look-up table 3 and a look-up table 5 having memory capacity of 64 words×2 bits and 16 words×2 bits, respectively.

Figure 3:
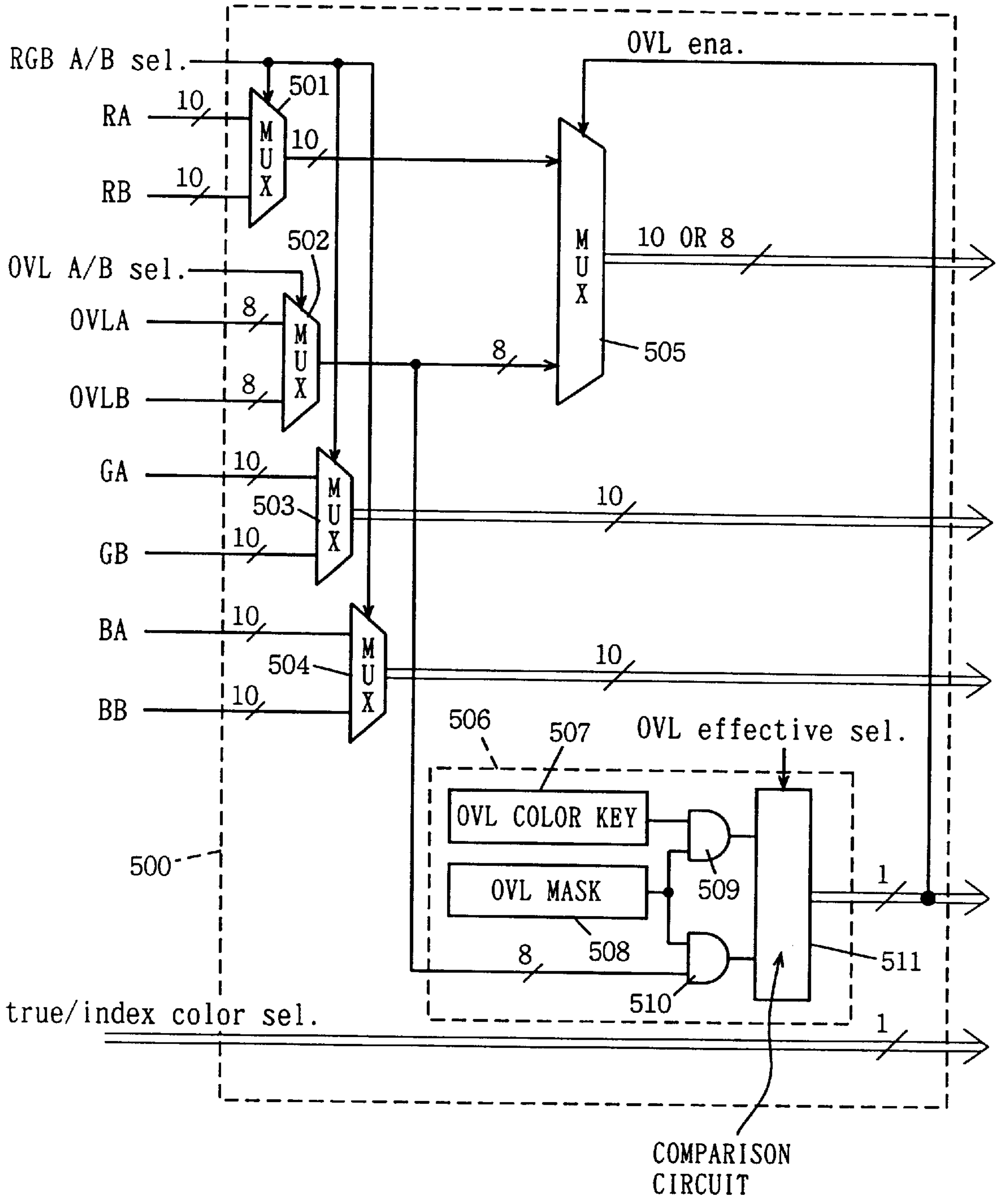
FIG. 3 is a diagram showing a structure of a multiplexer shown in FIG. 1.

FIG. 3 is a diagram showing a structure of multiplexer 500 shown in FIG. 1. As shown in FIG. 3, multiplexer 500 includes: three multiplexers 501, 503 and 504 each of which is connected to serial access memories A201 and B203, and selectively outputs one of the combinations of signals RA, GA, BA and signals RB, GB, BB in response to a signal RGBA/Bsel. supplied from register 91; a multiplexer 502 connected to serial access memories A201 and B203, and selectively outputting one of signals OVLA and OVLB in response to a signal OVLA/Bsel. supplied from register 91; a transparent mode determination circuit 506 connected to multiplexer 502; and a multiplexer 505 connected to multiplexers 501 and 502, and selectively outputting one of an R signal and an OVL signal in response to a signal OVLena. supplied from transparent mode determination circuit 506.

Transparent mode determination circuit 506 includes: an OVL color key 507; an OVL mask 508; an AND circuit having its input ends connected to multiplexer 502 and OVL mask 508; an AND circuit 509 having its input ends connected to OVL color key 507 and OVL mask 508; and a comparison circuit 511 connected to the output ends of AND circuits 509 and 510, and outputting a signal OVLena. in response to a signal OVL effective sel. input from register 91.

The operation of the frame buffer in accordance with an embodiment of the present invention will now be described.

First, the data to be written to look-up table 300 is supplied to external terminal 800. The data is written to look-up table 300 from control circuit 700 via write buffer 400.

Then, image signals, that is, frame information and window information such as RGB signals and OVL signals are supplied to external terminal 800, and stored in DRAM array 1000 via control circuit 700.

In the foregoing, the operation of writing data to a frame buffer in accordance with the present embodiment is described. The operation for reading image signals written to the DRAM array 1000 will now be described.

When control/address signals are supplied to external terminal 800, the image signals corresponding to the address stored in DRAM array 1000 are read to serial access memory A201 or serial access memory B203 from which image signals are serially output to register 90.

Here, serial access memories A201 and B203 operate in accordance with interleave method, that is, these memories alternately repeats the following operation. Namely, while serial access memory A201 outputs an image signal, an image signal is written to B203, and while B203 outputs an image signal, an image signal is written to A201.

In addition, window identification signal WID is supplied from register 90 to look-up table 300, and signals RA, GA, BA, OVLA output from serial access memory A201 and signals RB, GB, BB, OVLB output from serial access memory B203 are supplied from register 90 to multiplexer 500 via register 92.

Window identification signal WID is input to look-up table decoder circuit 302. The window identification signal has 10 bits, 6 bits of which are input to look-up table 3 having memory capacity of 64 words×2 bits as information for RGB. Further, the remaining 4 bits are input to look-up table 5 having memory capacity of 16 words×2 bits as information for OVL.

Then, a signal RGBA/Bsel. and true/index colorsel. having 1 word×2 bits, and a signal OVLA/Bsel. and OVLeffective sel. having 1 word×2 bits are supplied from look-up tables 3 and 5 to multiplexer 500 via register 91, respectively.

Signal RGBA/Bsel. is a signal which selects only the RGB signals output from one of serial access memories A201 and B203, whereas signal true/index colorsel. is a signal which identifies if an image signal corresponds to "true color" or "index color". If the color for the image signal is "true color", γ control is required, and therefore signal true/index colorsel. is output from multiplexer 500 to output terminal 600 via register 93, and then to external portion.

On the other hand, signal OVLA/Bsel. is a signal which selects an OVL signal output from one of serial access memories A201 and B203, whereas signal OVLeffective sel. is that which makes overlay color mode effective.

Signals RA, RB, GA, GB, BA, BB having 10 bits and input to multiplexer 500 are selected by signal RGBA/Bsel. as a combination of either signals RA, GA, BA or signals RB, GB, BB in multiplexers 501, 503 and 504 from each of which a 10-bit signal is output.

Further, one of 8-bit signals OVLA and OVLB is selectively output by signal OVLA/Bsel. in multiplexer 502.

In addition, when activated signal OVLeffective sel. is input to comparison circuit 511, signals OVLA or OVLB with 8 bits selectively output from multiplexer 502 is compared with overlay (OVL) color key 507 in comparison circuit 511. If it is determined that the signals match to each other based on the result, then overlay means transparent, and an inactivated signal OVLena. is output from comparison circuit 511. When signal OVLena. is inactivated, multiplexer 505 selectively outputs 10-bits signal RA or RB output from multiplexer 501.

It is noted that OVL mask 508 determines how many bits out of 8-bit signals OVLA or OVLB output from multiplexer 502 is to be compared with OVL color key 507.

Figure 4:
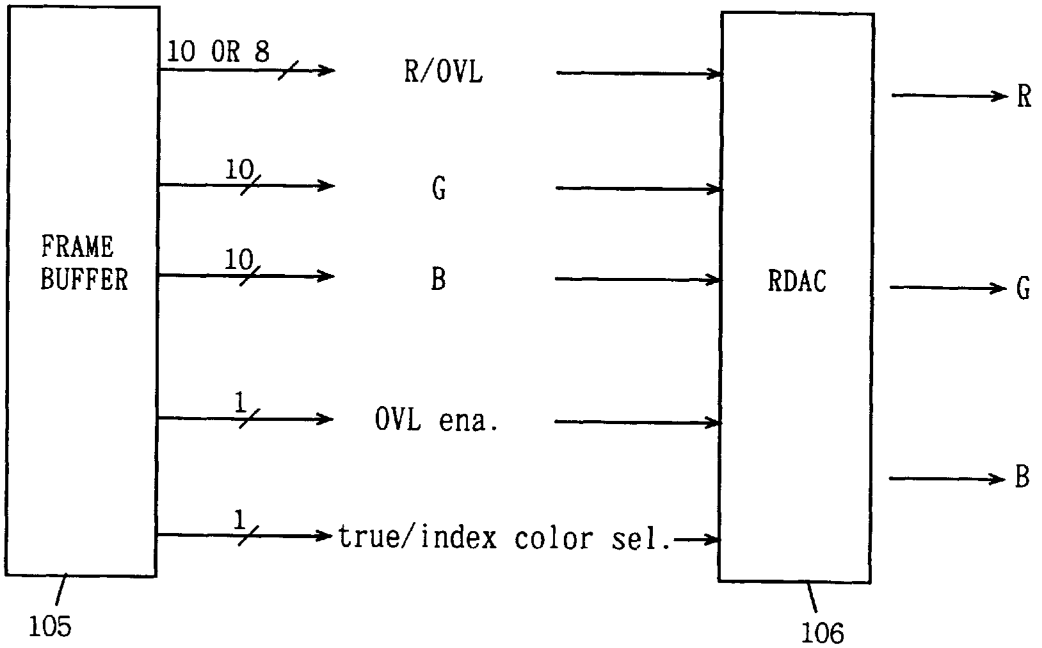
FIG. 4 is a diagram showing a connection between a frame buffer and an RDAC shown in FIG. 1.

According to the above described read operation, as shown in FIG. 4, as a result, R/OVL signal with 10 or 8 bits, G and B signals with 10 bits and signals OVLena. and true/index colorsel. with 1 bit are output for each pixel from the frame buffer, and therefore the information including at most 32 bits is transferred to RDAC 106.

Thus, according to the frame buffer in accordance with the embodiment of the present invention, thirty two output terminals 600 are sufficient, and therefore reduced consumption of electricity, simplification of the wiring on a board as well as reduction in cost can be achieved, as the number of output terminals is reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A frame buffer memory, comprising:

a semiconductor substrate;

first storage means formed on said semiconductor substrate for storing image information including color information for a plurality of colors and overlay image information about an overlay image plane;

a plurality of output terminals arranged in a plurality of sets corresponding to the plurality of colors, respectively;

a serial access memory formed on said semiconductor substrate for serially outputting said image information stored in said first storage means;

selection means formed on said semiconductor substrate and connected to said serial access memory for multiplexing and selectively outputting one of the overlay image information and the color information for one of the plurality of colors at one of the sets of output terminals corresponding to said one of the plurality of colors.

2. A frame buffer memory according to claim 1, wherein said selection means includes:

second storage means formed on said semiconductor substrate connected to said serial access memory for prestoring prescribed data such that said prescribed data is output corresponding to each inputted data; and selecting output means formed on said semiconductor substrate connected to said serial access memory for selectively outputting said image information according to said prescribed data output from said second storage means.

3. The frame buffer memory according to claim 2, wherein said second storage means is a look-up table.

4. The frame buffer memory according to claim 2, wherein said image information includes frame information and window information, said second storage means receives said window information, and said selecting output means receives said frame information.

5. The frame buffer memory according to claim 4, wherein said second storage means is a look-up table.

6. The frame buffer memory according to claim 1, further comprising means for outputting an overlay enable signal indicating whether said color information for said one of the plurality of colors or said overlay image information is selectively output.

* * * * *